United States Patent
Komatsuzaki et al.

(10) Patent No.: US 6,227,477 B1
(45) Date of Patent: *May 8, 2001

(54) DATA STORAGE CASSETTE AND DATA RECORDING AND REPRODUCING DEVICE

(75) Inventors: Shoji Komatsuzaki; Yoshihiro Endo, both of Utsunomiya; Ayumu Konno, Moka; Takumi Usui, Utsunomiya, all of (JP)

(73) Assignee: Aiwa Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,196

(22) Filed: Dec. 23, 1998

(30) Foreign Application Priority Data

Dec. 24, 2000 (JP) .................................................. 9-355581

(51) Int. Cl.[7] .................................................. G03B 23/02
(52) U.S. Cl. .................. 242/338; 242/338.4; 242/344; 360/132; 360/69
(58) Field of Search .................. 242/338, 338.4, 242/344; 360/132, 69, 71

(56) References Cited

U.S. PATENT DOCUMENTS

| | | | |
|---|---|---|---|
| 3,900,171 | * 8/1975 | Serizawa | 242/338.4 |
| 4,419,708 | * 12/1983 | Ogiro et al. | 360/132 |
| 4,484,248 | * 11/1984 | Ogiro et al. | 360/132 |
| 4,607,299 | * 8/1986 | Oishi et al. | 360/132 X |
| 4,734,812 | * 3/1988 | Tanaka et al. | 242/344 |
| 4,743,984 | 5/1988 | Ryan . | |
| 4,791,504 | * 12/1988 | Igarashi et al. | 242/338 |
| 4,844,378 | * 7/1989 | Oishi | 242/344 |
| 5,253,136 | * 10/1993 | Suzuki et al. | 360/132 |
| 5,537,279 | * 7/1996 | Takeda et al. | 360/132 |
| 5,638,239 | * 6/1997 | Ohgi | 360/132 |
| 5,651,509 | * 7/1997 | Suzuki et al. | 242/338.4 |
| 5,786,967 | * 7/1998 | Gerfast et al. | 360/132 |

FOREIGN PATENT DOCUMENTS

| | | |
|---|---|---|
| 0 312 106 | 4/1989 | (EP) . |
| 0 405 661 | 1/1991 | (EP) . |
| 0 594 450 | 4/1994 | (EP) . |
| 6-096555 | 7/1994 | (JP) . |
| 8-045232 | 6/1996 | (JP) . |

* cited by examiner

*Primary Examiner*—Donald P. Walsh
*Assistant Examiner*—Collin A. Webb
(74) *Attorney, Agent, or Firm*—David B. Abel; Squire, Sanders & Dempsey L.L.P.

(57) ABSTRACT

A data storage cassette includes an upper cassette half and a lower cassette half and containing therein a tape for storing data. The cassette has an outer shape of a predetermined dimension, and the lower cassette half is formed with a reel lock release hole. A discrimination hole is formed through the lower cassette half at a location adjacent to the reel lock release hole for discriminating the data storage cassette from another cassette having an outer shape of a dimension substantially identical with the abovementioned predetermined dimension of the outer shape of the data storage cassette. A data recording and reproducing device has a discrimination switch or a fixed pin for identifying the presence of the discrimination hole during a loading operation of the data storage cassette into the device and enabling only the data storage cassette to be loaded and set in the device.

12 Claims, 5 Drawing Sheets

DATA STORAGE CASSETTE AND DATA RECORDING AND REPRODUCING DEVICE

BACKGROUND OF THE INVENTION

1. Field of the Invention

The present invention relates to a data storage cassette used for storing data and to a data recording and reproducing device or apparatus. More specifically, the invention relates to a data storage cassette that can be discriminated or distinguished from the conventional cassette of the other kind and can be prevented from being erroneously loaded and set in the recording and reproducing device. The invention also relates to a data recording and reproducing device for recording and reproducing data with the use of such data storage cassette.

The data storage cassette of the invention is obtainable by making slight improvements on a lower cassette half of an existing or a conventional cassette, and similarly the data recording and reproducing device of the invention is obtainable by making slight improvements on a conventional data recording and reproducing device.

2. Related Art

A magnetic tape has been used as a medium for recording and storing a large amount of data, processed by a computer or the like, for backup purposes. Such magnetic tape is usually contained in a cassette. Such cassette is called "a data storage cassette" or "a cassette for data storage" (hereinafter referred to, also, as "data cassette"). Conventionally, the data cassette was constructed as a single-purpose cassette having a size or a dimension different from the cassettes of the other kind. Thus, a special cassette box for receiving such cassette was provided in the data recording and reproducing device.

Consequently, even if an 8-mm video cassette was inserted into such data recording and reproducing device having a special cassette box, the recording and reproduction could not be effected. Similarly, even if the data cassette was inserted into a video recording and reproducing device, the recording and reproduction could not be effected. Generally, such data cassette was expensive. Also the data recording and reproducing device was expensive since it lacked versatility.

Recently, from the viewpoint of the cost reduction, an attempt has been made to use an existing or a conventional video cassette as the data cassette. More specifically, an attempt has been made to use cassette halves having outer shapes substantially identical with those of the conventional video cassette, and to contain in the cassette halves a data recording or a data storage tape capable of effecting high-density recording.

If the cassette halves of the conventional video cassette are used as those of the data cassette, the cost can be reduced. Further, the video recording and reproducing device can be used as the data the recording and reproducing device by modifying a part of the video recording and reproducing device. This also contributes to the cost reduction.

In such a case, however, both of the video cassette and the data cassette can be loaded and set in the data recording and reproducing device. Thus, there is the fear that the user uses the data recording and reproducing device without noticing that the video cassette is erroneously loaded and set in the device.

SUMMARY OF THE INVENTION

It is therefore an object of this invention to provide a data cassette which can be obtained by making slight improvements on the existing or conventional cassette, and can be discriminated or distinguished from the conventional video cassettes.

Another object of the invention is to provide a data recording and reproducing device which can use such data cassette.

According to one aspect of the present invention, there is provided a data storage cassette including an upper cassette half and a lower cassette half and containing therein a tape for storing data, the cassette having an outer shape of a predetermined dimension, the lower cassette half being formed with a reel lock release hole, comprising: a discrimination hole formed through the lower cassette half at a location adjacent to the reel lock release hole for discriminating said cassette from another cassette having an outer shape of a dimension substantially identical with said predetermined dimension of the outer shape of the data storage cassette.

According to another aspect of the invention, there is provided a date recording and reproducing device for recording and reproducing data with the use of the above-mentioned data storage cassette comprising: discrimination means provided in the device for identifying the presence of the discrimination hole of the data storage cassette during a loading operation of the data storage cassette into the device and enabling only the data storage cassette to be loaded and set in the device for recording and reproducing data.

When the discrimination hole in the lower cassette half is detected or identified by the discrimination means on the device body, it is judged that the data storage cassette is to be loaded and set in the device body. In contrast, if the discrimination hole is not detected, it is judged that the cassette other than the data storage cassette is to be loaded and set in the device body. With such construction, the kind of the cassette can be easily and positively judged.

DESCRIPTION OF THE PREFERRED EMBODIMENTS

A preferred embodiment of a data storage cassette of the present invention, as well as a preferred embodiment of a data recording and reproducing device of the invention, will now be described in detail with reference to the drawings.

According to the invention, cassette halves (an upper cassette half and a lower cassette half) of an existing or a conventional video cassette may be used as cassette halves of the data cassette by making a slight modification thereon. For example, cassette halves of an 8 mm video cassette may be used as cassette halves of the data cassette by making slight improvement thereon. A recording and reproducing device for an 8 mm video may be used as the recording and reproducing device into which the data cassette can be loaded.

Figure 1:
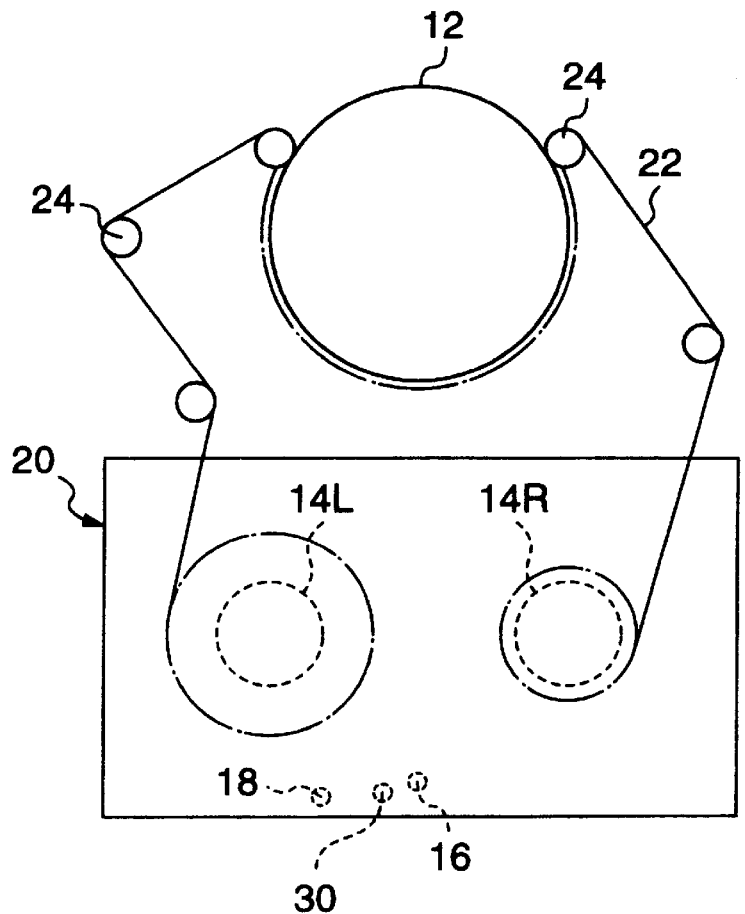
FIG. 1 is a view showing a data recording and reproducing device according to an embodiment of the present invention in a tape-loading condition.

FIG. 1 shows one preferred embodiment of the data recording and reproducing device 10 into which the data storage cassette of the present invention can be loaded. A high-density-recording magnetic tape 22, suited for recording and reproducing data, processed by a computer or the like, is contained or housed in the data cassette 20, and the magnetic tape 22 is extended or wound around a rotary drum 12 (for example, in an inverted Q-shape as shown in FIG. 1) via a plurality of guide rollers 24(including guide pins and tension regulator pins). In this wound condition or a tape-loading condition, the recording and reproduction of data are effected.

A lock release pin 16 for releasing locking of a pair of reels 14R and 14L is provided at a predetermined portion of a device body to be located beneath the data cassette 20. When the data cassette 20 is loaded and set in the device body, the lock release pin 16 is inserted in a reel lock release hole (more fully described later) formed in the data cassette 20, and as a result of this insertion, the locking of the reels 14R an 14L is released. This technique has been well known in the art.

A loading position detection switch 18 for determining whether or not the cassette is properly loaded on the pair of reels 14R and 14L is provided at that portion of the device body located near the lock release pin 16. When this switch 18 is turned on, such a control is effected that the cassette-in operation is stopped and a tape-loading operation is started.

In the present invention, discrimination or identification means (which comprises, for example, a discrimination or an identification switch 30) for discriminating the data cassette from other cassettes or identifying the data cassette, is provided on the device body. The discrimination means is disposed between the lock release pin 16 and the detection switch 18. In this embodiment, if the discrimination switch 30 is held in the OFF state or the OFF position during the cassette-in operation or the cassette loading operation, it is judged that the data cassette, rather than the cassette of the other kind, is to be loaded and set in the device for recording and reproducing data, and hence it is possible to properly load and set this cassette in the device body. After the cassette is thus loaded and set therein, the tape-loading operation, which is the operation necessary to be effected before the recording and reproducing operation, is effected.

On the other hand, if the discrimination switch 30 is turned on during the cassette loading operation, it is judged that the cassette other than the data cassette is to be loaded and set in the device. In such case, for example alarm means (such as a buzzer and an alarm indicator lamp) is operated. Further, it may be so constructed that the cassette is automatically discharged from the device body at this time. These points will be described hereinafter in further detail.

The data cassette 20 has unique features in connection with the discriminating switch 30, as will be described hereunder with reference to FIG. 2.

The data cassette according to the illustrated embodiments of the invention comprises two cassette halves (i.e., upper and lower cassette halves) having outer shapes of predetermined dimensions or sizes substantially identical with those of a conventional video cassette. The upper cassette half is designated in FIGS. 4 to 7 by 20B. FIGS. 2 and 3 illustrate a construction of the lower cassette half 20A. More specifically, FIG. 2 shows an internal structure of the lower cassette half 20A, and FIG. 3 shows an external structure thereof. In FIG. 2, the lower cassette half 20A includes an outer wall (or flange) 21 extending over an entire outer periphery of the cassette half 20A, and inner walls 32 and 34 formed integrally with the outer wall 21. The inner walls 32 and 34 are formed to extend along parts of outer peripheries of generally disk-shaped reel flanges. These inner walls 32 and 34 shut off or isolate the interior of the cassette from the exterior thereof and prevents dusts, dirts or the like from entering the interior.

Figure 2:
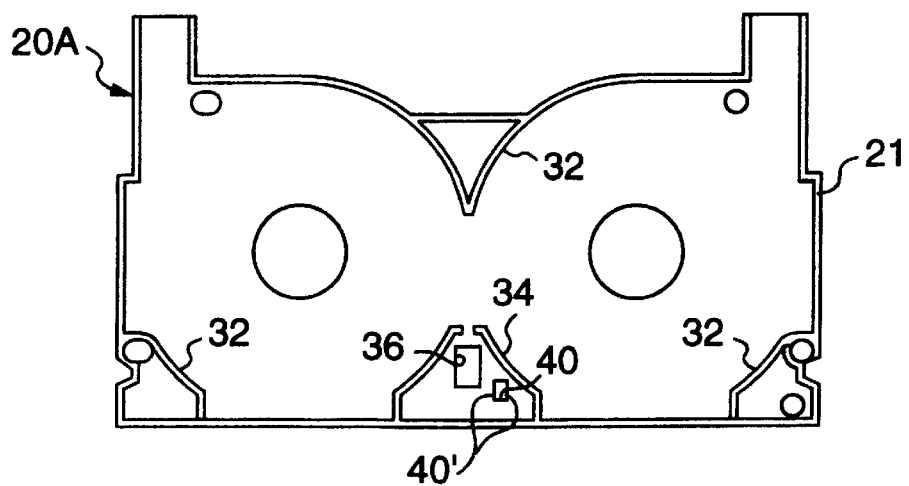
FIG. 2 is a plan view showing an internal structure of a lower cassette half of a data cassette according to an embodiment of the invention.
Figure 3:
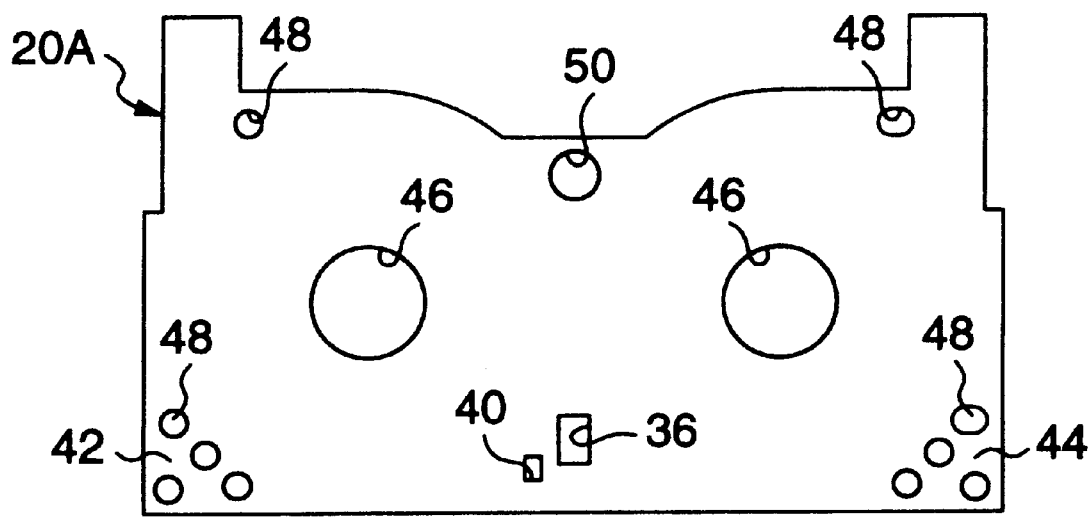
FIG. 3 is a view of the lower cassette half as viewed from its bottom side.

The inner wall 34, provided at a lower central portion of the lower cassette half 20A, as viewed in FIG. 2, has a generally inverted V-shape with its top notched. The reel lock release hole 36 having a rectangular shape is formed through an upper central portion of that area or location of the lower cassette half 20A surrounded by the inner wall 34. A reel lock release pawl (not shown) is provided to close this lock release hole 36. When the cassette-in operation is effected, the lock release pin 16, provided on the device body, is inserted into the lock release hole 36 to move the reel lock release pawl, thereby releasing locking of the pair of reels 14R and 14L.

According to the invention, a discrimination hole or an identification hole 40 is formed through the lower cassette half 20A at a location or within an area surrounded by the inner wall 34. The discrimination hole 40 is located adjacent to the lock release hole 36. In the embodiment shown in FIGS. 2 and 3, the discrimination hole 40 has a substantially rectangular shape. The longer sides 40' of the rectangular discrimination hole 40 extends in a direction substantially parallel to the direction of insertion of the cassette into the device. Further, the discrimination hole 40 is formed substantially parallel to, and in a juxtaposed relation to, the rectangular reel lock release hole 36 of a larger size. FIG. 3 shows the discrimination hole 40 viewed from the outer surface of the lower cassette half 20A.

Figure 10A:
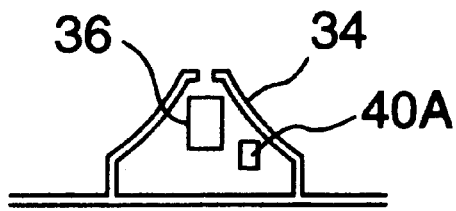
FIGS. 10A to 10C are views showing various shapes of a discrimination hole formed in the lower cassette half.
Figure 10B:
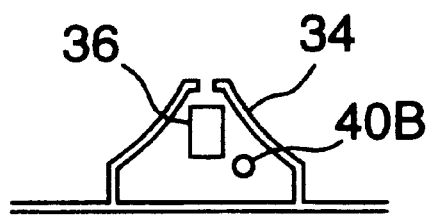
Figure 10C:
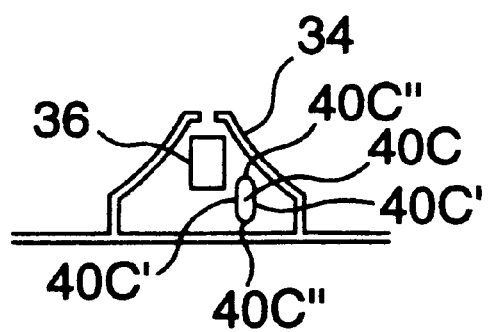

In the embodiment shown in FIGS. 2 and 3, the discrimination hole 40 has a substantially rectangular shape as described above. However, various shapes, other than the rectangular shape, may be adopted as the shapes of the discrimination hole. FIGS. 10A and 10B illustrate discrimination holes 40A and 40B having substantially square shape and substantially circular shape, respectively. In an example of FIG. 10C, the discrimination hole 40C is an elongated hole with rounded opposite ends 40C'". The longer sides 40C' of the hole 40C extend substantially parallel to the direction for inserting the cassette into the device body, as similar to the case of the substantially rectangular discrimination hole 40.

As described above, the discrimination hole 40 is formed at the location or within the area surrounded by the inner wall 34. This contributes to preventing dusts and dirts to enter the interior of the cassette even if this discrimination hole 40 is formed through the lower half 20A. The formation of the discrimination hole 40 at such location or area is also preferable in that a space for disposing the discrimination switch (discrimination means) 30, which cooperates with the discrimination hole 40, may be secured in the device body.

As shown in FIG. 3, a plurality of through holes 42 and 44 are formed at each of right and left corner portions of the lower cassette half 20A. However, it is difficult to conveniently use these through holes 42 and 44 as the abovementioned discrimination hole, since the purpose of use of these holes 42 and 44 is already determined. For such reason, the discrimination hole 40 is formed at the above-described location.

As shown in FIGS. 2 and 3, the lower cassette half 2A is formed with a pair of through holes 46 for reels, a plurality of through holes (circular and oval holes) 48 for positioning the cassette at the time of the cassette-in operation, and a through hole 50 for receiving detection means for detecting a tape end. These through holes have been well known in the art.

According to the illustrated embodiment, the discrimination hole 40 is formed in the lower cassette half 20A, and the discrimination switch (discrimination means) 30 is provided at that portion of the device body corresponding to the discrimination hole 40. With such construction, the data cassette 20 can be accurately discriminated from other cassettes such as a video cassette and hence the proper processing or operation can be carried out.

The discriminating operation will now be described with reference to FIGS. 4 to 7. For clarifying the illustration, the members not related to the discrimination operation are omitted from these figures.

Figure 4:
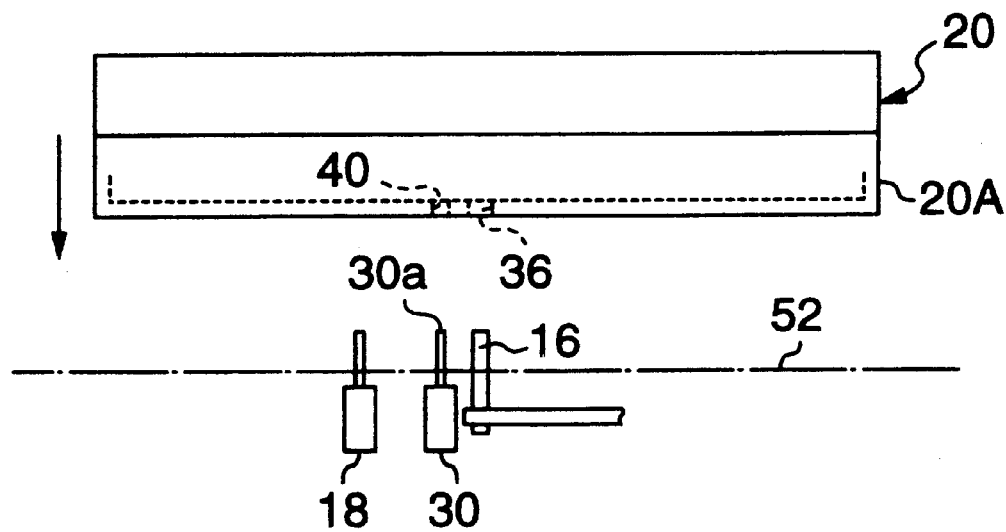
FIGS. 4 to 6 are views showing an operation for discriminating the data cassette.

FIG. 4 shows the relation of the cassette 20 with the device body into which the cassette 20 is to be loaded. A dot-and-dash line 52 indicates a reference surface of the device body. The reel lock release pin 16 is mounted at a predetermined position of this reference surface 52. The detection switch 18 is located near the reel lock release pin 16 for determining as to whether or not the cassette is loaded into the proper position at the time of the cassette-in operation. The discrimination switch 30 is provided at a predetermined position between the detection switch 18 and the reel lock release pin 16.

Figure 5:
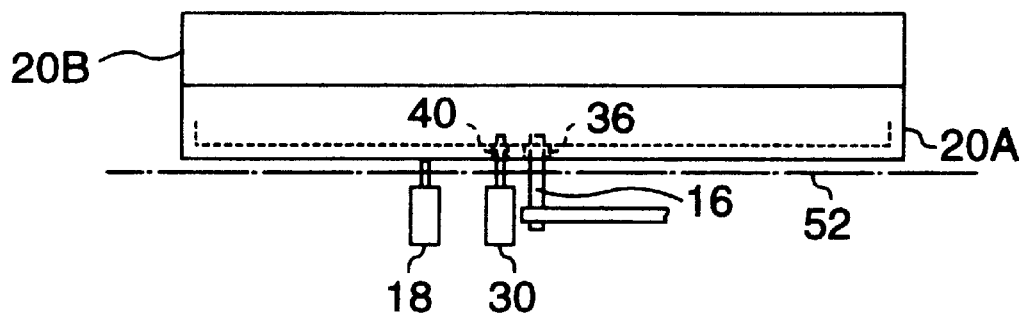

The lock release hole 36 and the discrimination hole 40 are formed respectively through those portions of the lower cassette half 20A corresponding respectively to the reel lock release pin 16 and the discrimination switch 30. Thus, when the data cassette 20 is moved downward onto the reference surface 52 during the cassette-in operation or cassette loading operation, the lock release pin 16 can be inserted into the lock release hole 36 while an operating portion 30a of the discrimination switch 30 can be inserted into the discrimination hole 40. Therefore, as shown in FIG. 5, the data cassette 20 is properly moved downward onto the reference surface 52, and this is detected by the detection switch 18, so that the cassette-in operation or cassette loading operation is finished. Since the operating portion 30a of the discrimination switch 30 is not pressed by a bottom surface of the lower cassette half 20A and is kept in the condition of FIG. 4, it is judged that the cassette is the data cassette 20, rather than the cassette of other kind, and immediately the operation is shifted to the tape-loading mode.

Figure 6:
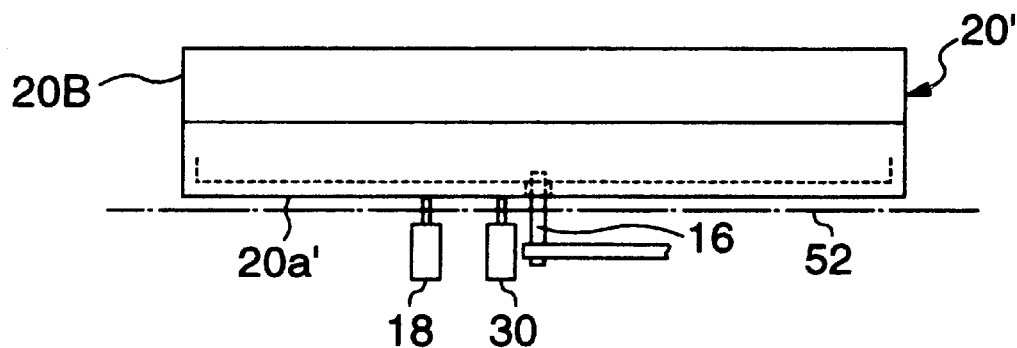

On the other hand, when a cassette (e.g. an 8 mm video cassette) 20' other than the data cassette is inserted into or is to be loaded and set in the device body and the cassette is moved downward during the cassette-in operation, the operating portion 30a of the discrimination switch 30 is pressed by a bottom surface 20a' of the lower cassette half and moved downwardly, as shown in FIG. 6. When the video cassette 20' reaches the reference surface 52, the detection switch 18 is turned on, so that the cassette-in mode is stopped.

In this cassette-in mode, the discrimination switch 30 is turned on, and therefore a controller (not shown), provided in the device body, judges that the cassette 20' is the cassette other than the data cassette, and prohibits the operation from shifting to the tape-loading mode. As a result, the data recording-reproducing mode for the video cassette 20' is prohibited. This condition is informed to the user by the above-mentioned alarm means. Thus, there can be avoided the situation that data is recorded and reproduced with the use of the wrong cassette. It is possible to effect such a control as to automatically discharge the cassette 20' at the time that the cassette is judged as the cassette other than the data cassette.

Figure 7:
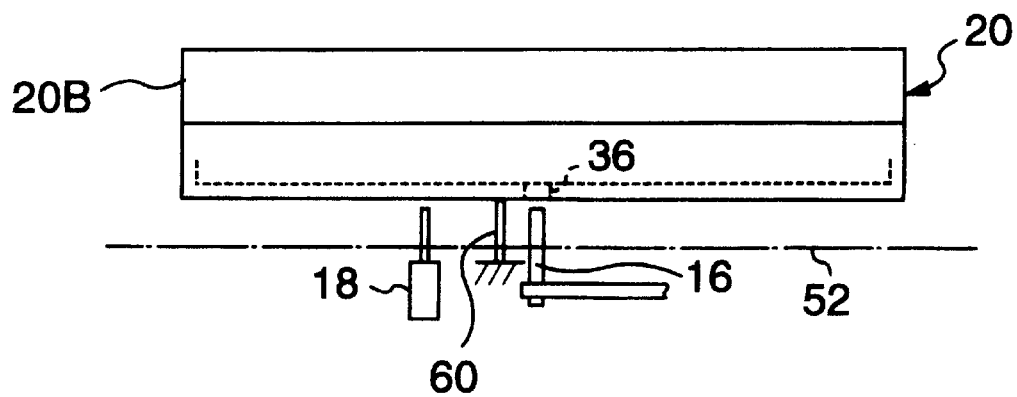
FIG. 7 is a view showing an operation for discriminating a data cassette according to a modified embodiment of the invention.

In the above-described embodiment, the discrimination switch 30 is used as the discrimination means. Instead of the discrimination switch 30 a discrimination pin or a fixed pin 60 may be used as the discrimination means, as shown in FIG. 7. The length of the discrimination pin 60 projecting from the reference surface 52 is slightly larger than the lengths of the lock release pin 16 and the detection switch 18 projecting from the surface 52. Such construction is adopted in order that the discrimination of the cassette can be carried out as soon as possible. In the case where the discrimination pin 60 is used, the cassette can not further move downward when the lower cassette half 20A engages the discrimination pin 60, so that the user can realize that the wrong cassette is to be loaded and set in the device body. Therefore, also in this case, there can be avoided the situation that data is recorded and reproduced with the use of the wrong cassette. In this case, alarm means may be driven to give warning to the user.

Figure 8:
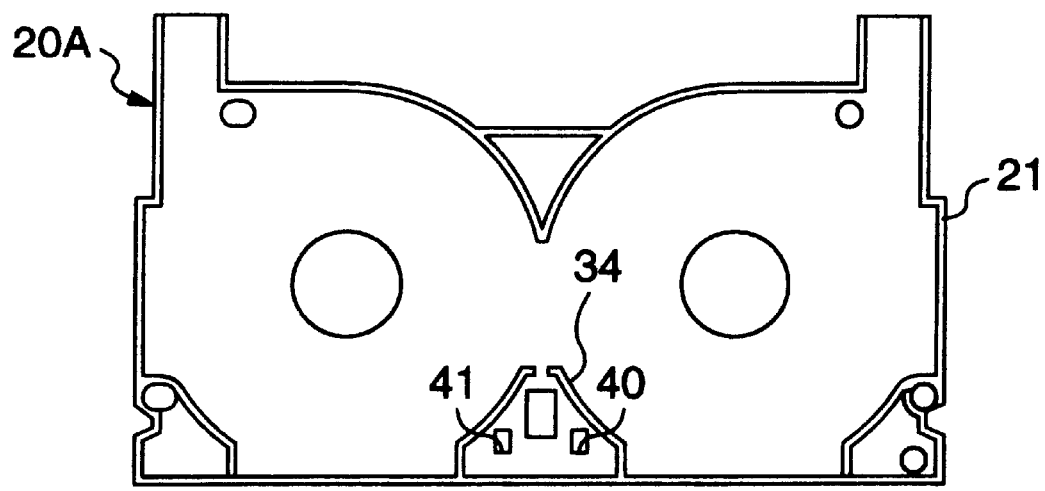
FIG. 8 is a plan view showing an internal structure of a modified lower cassette half.
Figure 9:
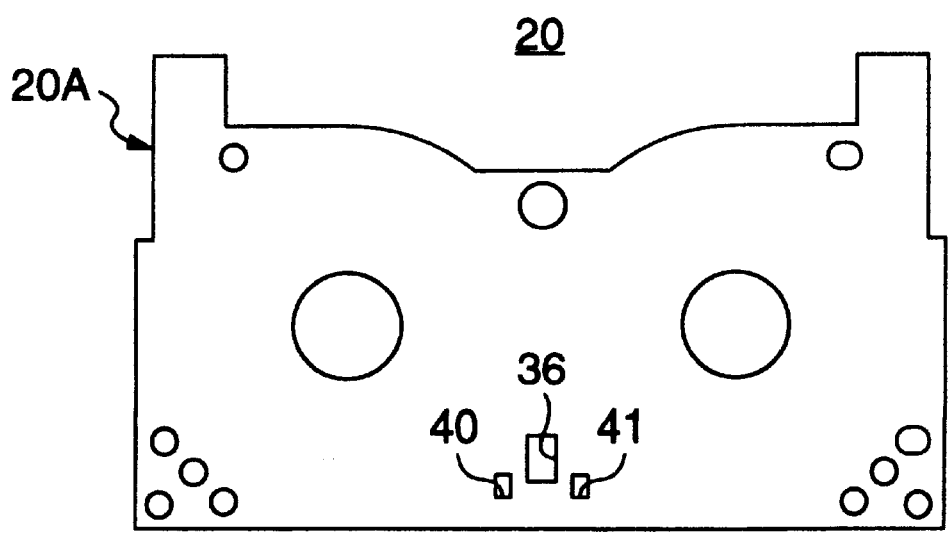
FIG. 9 is a view of the lower cassette half of FIG. 8 as viewed from its bottom side.

In the embodiment of FIG. 2, one discrimination hole 40 is formed through the lower cassette half 20A. However, two or more discrimination holes may be formed through the lower cassette half 20A. In the structure illustrated in FIGS. 8 and 9, a second discrimination hole 41, having substantially the same shape and size as those of the discrimination hole (first discrimination hole) 40, is additionally formed through the lower half 20A at the area or the location surrounded by the inner wall 34. The first and second discrimination holes 40 and 41 are disposed generally symmetrically with respect to the lock release hole 36. In this case, a second discrimination switch (not shown), serving as discrimination means, is additionally provided on that portion of the device body to be opposed to the second discrimination hole 41.

The second discrimination switch can be used in the following manner. For example, in the case where a first data cassette containing a high-density recording tape and a second data cassette containing a higher-density recording tape are used, it is preferable that the kind of the cassette or tape can be judged.

In such case, the lower cassette half 20A of the first data cassette in which the abovementioned high-density recording tape (first high-density recording tape) is contained or housed is formed with one discrimination hole 40, while the lower cassette half 20A of the second data cassette in which the abovementioned higher-density recording tape is contained or housed is formed with two discrimination holes 40 and 41.

In the such case, the device body is constructed to include a first and a second discrimination switches and a logic circuit into which output signals from the first and second discrimination switches are inputted. With such construction, it may be easily and accurately judged as to whether or not the cassette to be loaded is a data cassette, and if it is the data cassette what kind of tape the data cassette contains. It is herein to be noted that, when the first and second discrimination switches are provided in the device body, each switch should have a construction similar to that of the discrimination switch 30 as shown in FIGS. 4 to 6. That is, each switch should have an operating portion similar to the operating portion 30a of the switch 30 which is moved downwardly to shift the switch from an OFF position to an ON position (or from ON position to an OFF position) when pressed by a bottom surface of the lower cassette half.

A square hole, a rectangular or an oblong hole, a circular hole, an elongated hole with rounded opposite ends, or other hole may be used as the discrimination hole 41, as similar to the case of the discrimination hole 40. In the case where a rectangular hole or an elongated hole with rounded opposite ends is used as the discrimination hole 41, it is preferable that the longer sides or edges of the hole 41 extend substantially parallel to the direction of insertion of the cassette, as similar to the case of the discrimination holes 40 and 40C. With such arrangement, the loading of the cassette into the device body can be smoothly effected.

As will be understood from the foregoing description, according to the invention, the lower cassette half of the cassette is formed at the specified area or location with the discrimination hole for distinguishing between the data cassette and other cassettes. The recording and reproducing device includes the discrimination means cooperating with the discrimination hole. In response to an output signal from the discrimination means, the cassette to be loaded and set in the recording and reproducing device is judged to be either the data cassette or the other cassette and the processing or operation necessary for the loaded cassette is carried out.

Since the data cassette and other cassettes can be clearly discriminated or distinguished from each other, the wrong processing, such as to record data into a video cassette or the like, can be reliably avoided with the simple construction.

What is claimed is:

1. A data storage cassette including an upper cassette half and a lower cassette half and containing therein a tape for storing data, said cassette having an outer shape of a predetermined dimension, said lower cassette half having a reel lock release hole, comprising:
    a discrimination hole defined through said lower cassette half at a location substantially adjacent to said reel lock release hole for discriminating said cassette from another cassette having an outer shape of a dimension substantially identical with said predetermined dimension of the outer shape of said data storage cassette; and
    an inner wall surrounding said reel lock release hole and said discrimination hole.

2. A data storage cassette according to claim 1, wherein said discrimination hole is any one of a square hole, a rectangular hole, a circular hole and an elongated hole with rounded opposite ends.

3. A data storage cassette according to claim 1, wherein said discrimination hole is one of a rectangular hole and an elongated hole with rounded opposite ends, each of said rectangular hole and said elongated hole having longer sides extending substantially parallel to a direction for inserting said data storage cassette into a data recording and reproducing device.

4. A data storage cassette including an upper cassette half and a lower cassette half and having an interior space containing therein a tape for storing data, said cassette having an outer shape of a predetermined dimension, said lower cassette including a reel release hole, comprising:
    a discrimination hole defined through said lower cassette half at a location substantially adjacent to said reel lock release hole for discriminating said cassette from another cassette having an outer shape of a dimension substantially identical with said predetermined dimension of the outer shape of said date storage cassette; and
    an inner wall coupled to said lower cassette half, said inner wall surrounding said reel lock release hole and substantially isolating said interior space from said cassette from an area surrounded by said inner wall, said discrimination hole defined within said area surrounded by said inner wall.

5. A data recording and reproducing device for recording and reproducing data on a data storage cassette, said data storage cassette comprising an upper cassette half and a lower cassette half and containing therein a tape for storing data, said cassette having an outer shape of a predetermined dimension, said lower cassette half including a reel lock release hole, a discrimination hole defined through said lower cassette half at a location substantially adjacent to said reel lock release hole, and an inner wall surrounding said reel lock release hole and said discrimination hole, comprising:
    discrimination means for identifying the presence of said discrimination hole surrounded by said inner wall so as to discriminate said cassette from another cassette having an outer shape of a dimension substantially identical with the outer shape of said predetermined dimension of said data storage cassette and to enable only said data storage cassette to be loaded and set in said device for recording and reproducing data; and
    reel lock release means, located substantially adjacent to said discrimination means, for inserting in said reel lock release hole.

6. A data recording and reproducing device according to claim 5, wherein said discrimination means includes a fixed pin adapted to be received in said discrimination hole of said data storage cassette during said loading operation, said fixed pin being arranged to abut against a bottom surface of said another cassette not formed with said discrimination hole, thereby preventing said another cassette from being loaded and set in said device, when said another cassette is to be loaded into said device.

7. A data recording and reproducing device according to claim 5, wherein said discrimination means includes a discrimination switch having an operating portion adapted to be received in said discrimination hole of said data storage cassette during said loading operation, said operating portion of said discrimination switch being arranged to abut against a bottom surface of said another cassette not formed with said discrimination hole, thereby shifting said discrimination switch from an OFF position to an ON-position, when said another cassette is to be loaded into said device.

8. The device of claim 5, further comprising a detection switch, and wherein said discrimination means is disposed between said reel lock release means and said detection switch.

9. A data recording and reproducing device for recording and reproducing data on a data storage cassette, said data storage cassette comprising an upper cassette half and having an interior space containing therein a tape for storing data, said cassette having an outer shape of a predetermined dimension, said lower cassette including a reel lock release hole, a discrimination hole defined through said lower cassette half at a location substantially adjacent to said reel lock release hole, and an inner wall coupled to said lower cassette half, said inner wall surrounding said reel lock release hole and substantially isolating said interior space of said cassette from an area surrounded by said inner wall, said discrimination hole defined within said area surrounded by said inner wall, comprising:

discrimination means for identifying the presence of said discrimination hole surrounded by said inner wall during a loading operation of said data storage cassette into said device so as to discriminate said cassette from another cassette having an outer shape of a dimension substantially identical with said predetermined dimension of the outer shape of said data storage cassette and to enable only said data storage cassette to be loaded and set in said device for recording and reproducing data; and reel lock release means, located substantially adjacent to said discrimination means, for inserting in said reel lock release hole.

10. A data recording and reproducing device according to claim 9, wherein said discrimination means includes a fixed pin adapted to be received in said discrimination hole of said data storage cassette during said loading operation, said fixed pin being arranged to abut against a bottom surface of said another cassette not formed with said discrimination hole, thereby preventing said another cassette from being loaded and set in said device, when said another cassette is to be loaded into said device.

11. A data recording and reproducing device according to claim 9, wherein said discrimination means includes a discrimination switch having an operating portion adapted to be received in said discrimination hole of said data storage cassette during said loading operation, said operating portion of said discrimination switch being arranged to abut against a bottom surface of said another cassette not formed with said discrimination hole, thereby shifting said discrimination switch from an OFF position to an ON position, when said another cassette is to be loaded into said device.

12. The device of claim 9, further comprising a detection switch, and wherein said discrimination means is disposed between said reel lock release means and said detection switch.

* * * * *

UNITED STATES PATENT AND TRADEMARK OFFICE
CERTIFICATE OF CORRECTION

PATENT NO.    : 6,227,477 B1                                             Page 1 of 1
DATED         : May 8, 2001
INVENTOR(S)   : Komatsuzaki Yoshihiro et al.

It is certified that error appears in the above-identified patent and that said Letters Patent is hereby corrected as shown below:

Title page,
Item [30], Foreign Application Priority Data
Dec. 24, 1997 (JP) ...............................9-355581

Signed and Sealed this

Eighth Day of January, 2002

Attest:

Attesting Officer

JAMES E. ROGAN
*Director of the United States Patent and Trademark Office*